Feb. 4, 1930.  G. C. PEARCE  1,745,864
CONTROL DEVICE
Filed July 14, 1927   2 Sheets-Sheet 1
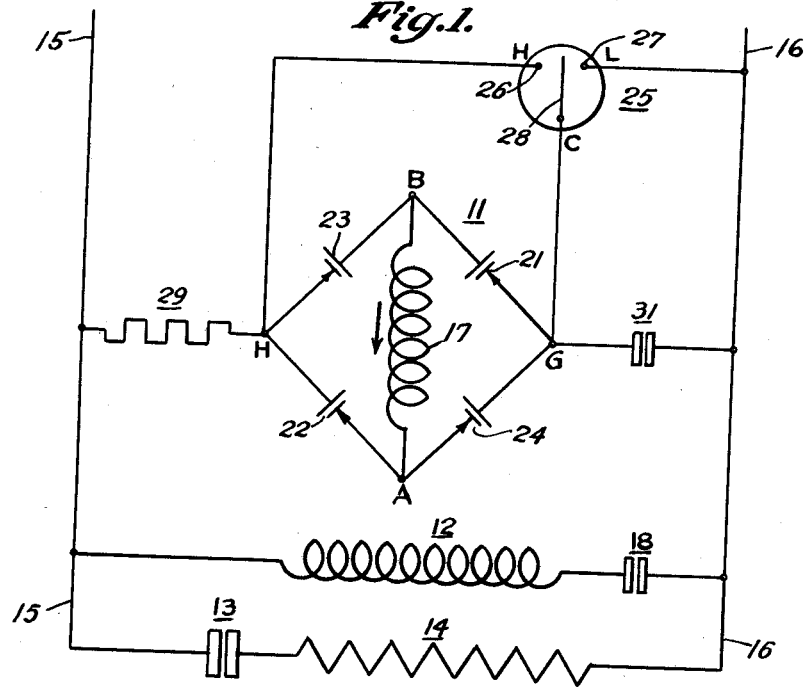
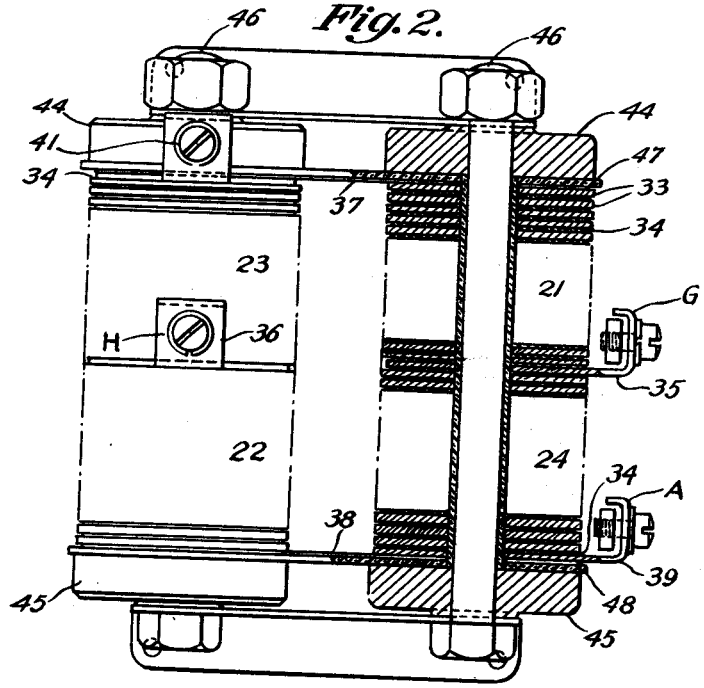
INVENTOR
George C. Pearce
BY
Wesley G. Carr
ATTORNEY Feb. 4, 1930.  G. C. PEARCE  1,745,864
CONTROL DEVICE
Filed July 14, 1927   2 Sheets-Sheet 2

INVENTOR
George C. Pearce
BY
Wesley G. Carr
ATTORNEY

Patented Feb. 4, 1930

1,745,864

UNITED STATES PATENT OFFICE

GEORGE C. PEARCE, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL DEVICE

Application filed July 14, 1927. Serial No. 205,580.

My invention relates to control devices of the alternating and unidirectional current type.

An object of my invention is to provide a control device that shall be responsive to currents of low values.

Another object of my invention is to provide means for a relay that is energized from a source of alternating current, whereby noise and humming, incident to alternating current, may be eliminated.

A still further object of my invention is to provide a relay that is energizable from a source of alternating current of any frequency.

And a still further object of my invention is to provide a control device in which a contact-making and breaking instrument is utilized for making and breaking an alternating-current circuit in order to control a unidirectional-current circuit, the unidirectional current being derived from the source of alternating current.

In practicing my invention, I provide a control device that comprises, in general, an electromagnet coil for controlling a switch, a rectifier for supplying the coil with unidirectional current from a source of alternating current, and means responsive to such conditions as temperature, pressure, etc., for controlling the supply of alternating current to the rectifier.

For a fuller understanding of my invention, reference may be had to the following description taken in conjunction with the accompanying drawings, in which, Figure 1 is a diagrammatic view of circuits and apparatus embodying my invention.

Fig. 2 is a view, in front elevation, partially in section, of a rectifier embodied in the apparatus illustrated in Fig. 1.

Figure 3:
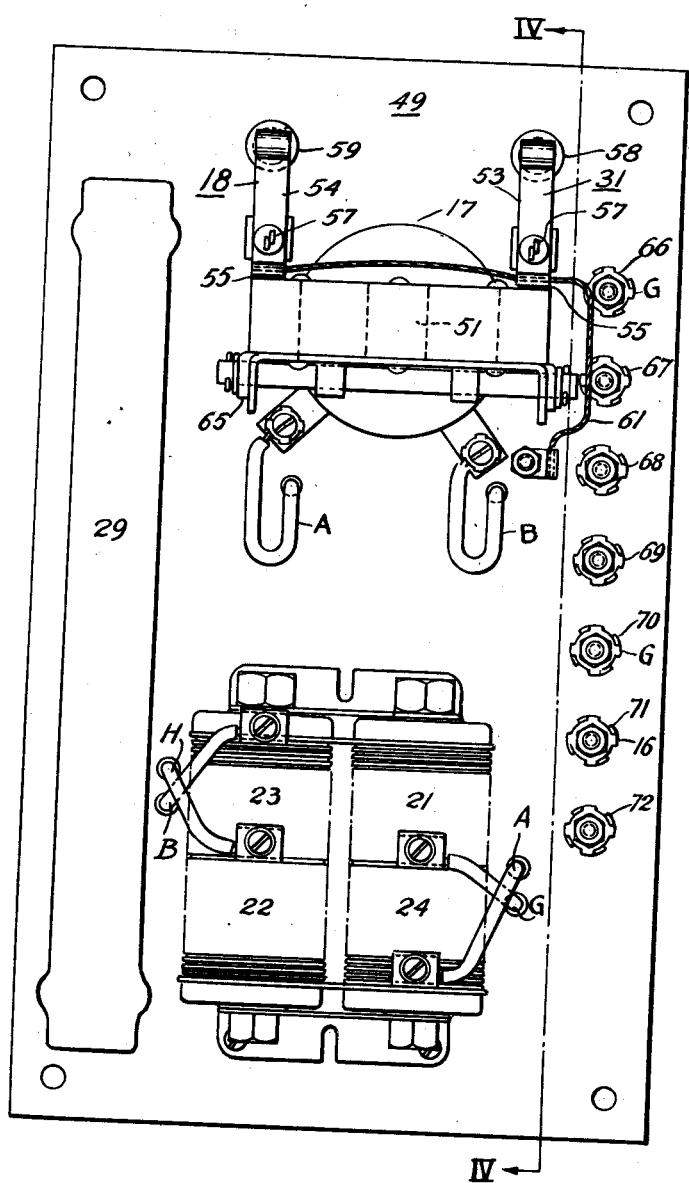
Fig. 3 is a view, in front elevation, of a device embodied in the circuits and apparatus illustrated in Fig. 1.

In the drawings, a control device 11 is shown that is utilized for controlling an electromagnetic switch comprising a coil 12 and a circuit interrupter 13, the circuit interrupter being utilized for controlling the energization of a resistor 14 for heating a body or medium (not shown). When the circuit interrupter 13 is in its circuit-closing position, the resistor 14 may be energized from alternating-current electric-energy-supply conductors 15 and 16 or any other suitable source.

In order that the coil 12 may be energized from the supply conductors 15 and 16, an electromagnetic switch, comprising a coil 17 and a switch 18, is provided, the switch 18 being actuated to a circuit-closing position when the coil 17 is energized. In order that the coil 17 may be energized in response to a relatively small current traversing the same, the coil is supplied with unidirectional current from a double-wave rectifier comprising rectifying elements 21 to 24, inclusive. The rectifying elements are so arranged that the positive and negative values of the alternating current flow through the coil from B to A.

In order that the coil 17 may be intermittently energized and deenergized in accordance with a condition effected by the resistor 14, a control instrument 25 is provided. The instrument 25 comprises a stationary contact 26 that is connected to the rectifier at H, a stationary contact 27 that is connected to the supply conductor 16, and a movable contact member 28 that is connected to the rectifier at G.

The point H of the rectifier is connected to the supply conductor 15 through a current-limiting resistor 29.

The movable contact member may be actuated by a coil (not shown) that is energized from a thermocouple (not shown) in a manner well known in the art. It is to be understood, also, that the contact member 28 may be actuated by other means, such as Bourdon tubes and pressure-responsive means.

If the thermal condition of the body or medium effected by the resistor 14 is below a predetermined value, the movable contact member 28 will be caused to engage the stationary contact 27. When in this position, current of one polarity flows from the conductor 16 through the contacts 27 and 28, the rectifying element 21, coil 17, rectifying element 22 and the resistor 29 to the supply conductor 15, and current of the opposite polarity flows from the conductor 15, through the resistor 29, rectifying element 23, coil 17, rectifying element 24, contacts 28 and 27 to the conductor 16. Thus, it is seen that current flows through the coil 17 in the direction indicated by the arrow, that is, the coil 17 is supplied with a unidirectional current.

In order that the contacts 27 and 28 may be relieved from current-carrying duty the moment the coil 17 has been energized, a switch 31 is provided which is actuated to a circuit-closing position upon the energization of the coil 17 and released to a circuit-opening position when the coil is deenergized. When the coil 17 has been energized and the switch 31 actuated to a circuit-closing position, current will flow through the rectifier from the conductor 16, through the switch 31 and the rectifier in the manner set forth above.

When the thermal condition effected by the resistor 14 is increased to a predetermined value, the movable contact arm 28 will be caused to engage the stationary contact 26, thereby shunting the rectifier elements 21 to 24, inclusive, out of the alternating-current circuit and causing the coil 17 to be deenergized. Upon deenergization of the coil, the switches 31 and 18 are actuated to their open-circuit positions, thereby effecting deenergization of the rectifier, the coil 12 and the resistor 14. Thus, it is seen that the temperature surrounding the resistor 14 may be controlled between predetermined limits in the manner set forth above.

It is well known that the characteristics of a direct-current or unidirectional current electromagnet coil are such that a smaller current is required to effect sufficient energization thereof than when energized from an alternating-current source. It is also well known that the burning effects of alternating current upon the contacts of a contact-making and breaking instrument are less injurious than those caused by direct current. Therefore, it is evident from an examination of Fig. 1 of the drawings that, since a smaller current is required to energize the coil 17, unidirectional current being provided from the rectifying elements, an alternating current of less value will be required to supply the rectifier with sufficient components of current to provide the necessary unidirectional current for the coil. Since a smaller alternating current is required, than would be the case if the rectifying elements were not used, the contacts 26 to 28, inclusive, are considerably relieved of current-carrying duty, with the effect that sparking and burning therebetween is reduced to a negligible value. Further, the coil 17 may be energized from a supply of alternating current, irrespective of its frequency, and, since the coil is energized by unidirectional current, the well-known humming and vibration incident to alternating current for electromagnetic purposes is eliminated.

While I do not wish to be limited to any specific form of rectifier, a preferred type of rectifier for my present purpose is illustrated in Fig. 2 of the drawings. As there shown, each of the rectifying elements 21 to 24, inclusive, comprises a plurality of washers or discs 33 separated from each other by washers or discs 34 of lead or other suitable material. As shown, each of the rectifying elements 21 to 24, inclusive, comprises a plurality of such washers 33 and 34. The rectifying elements 21 and 24 and 22 and 23 may be separated by terminals 35 and 36, respectively.

The upper washers 33 of the elements 21 and 23 are connected together by a metal conductor 37, and the lowermost washers of the elements 22 and 24 are connected together by a metal conductor 38. As shown in Fig. 2, a terminal 39 is provided between the washer 34 and the conductor 38, and a terminal 41 is disposed between the conductor 37 and the washer 34.

The assembly of the discs 33 and 34 and the cooperating terminals and connectors 37 and 38 may be clamped together, as a whole, by means of end plates 44 and 45 and insulated bolts 46, the end plates 44 and 45 being insulated from the connectors 37 and 38 by strips of insulation 47 and 48. The assembly may then be drawn together tightly in order that intimate contact may be effected between the washers 33 and 34 and the cooperating terminals.

The rectifying discs 33 may be prepared in accordance with the method set forth in a copending application, Serial No. 135,899, filed September 16, 1926 and assigned to the Westinghouse Electric & Manufacturing Company, and assembled, if desired, in accordance with British Patent 194,653, or in accordance with the assembly illustrated in Fig. 2.

Discs constructed in accordance with the copending application, Serial No. 135,899, severally consist of a thin copper layer and a cuprous oxide layer superposed on, and intimately united with, a body portion of copper. Such discs are electrically conducting in the direction from the cuprous oxide layer to the body portion of the copper disc or washer but are substantially non-conducting in the opposite direction. For purposes of illustration, it may be assumed that the discs 33, in the rectifying elements 21 to 24, inclusive, are so arranged that the upper surfaces of the washers or discs comprise the copper and cuprous oxide layers and the lower edges or body portions represents copper in its metallic form.

If a source of alternating current be connected to the terminals 35 and 36, and an electromagnet coil or other electro-responsive device be connected across the terminals 39 and 41, unidirectional current will flow through the electro-responsive device from the terminals 39 and 41, and alternating current will flow between the terminals 35 and 36, substantially in accordance with the schematic illustration shown in Fig. 1.

In Fig. 3 of the drawings, the rectifier illustrated in Fig. 2, the resistor 29 of Fig. 1, the coil 17 and the switches 18 and 31 are shown mounted on a base or panel 49. The coil 17 is mounted on a central leg 51 of a core of substantially E-shape. The core is provided with an armature 52, on which movable contacts 53 and 54 are yieldingly mounted by means of brackets 55, springs 56 and bolts 57. The yieldingly mounted contacts 53 and 54 engage cooperating stationary contact members 58 and 59. The contacts 53 and 58 may be considered as constituting the switch 31, and the contacts 54 and 59 may be considered as constituting the switch 18. The yieldingly mounted contacts 53 and 54 are provided with a flexible conductor 61 whereby a single connection may be made to the conductor 16.

The armature 52 is provided with a rearwardly extending bracket 63 that is secured to the armature 52 by rivets or other suitable means. The bracket may be pivotally supported by a hinge pin 64, which, in turn, is supported by a bracket 65 secured to the core of E-shape. When the coil 17 is in an energized condition, the armature 52 is held in the position shown in the drawings, in order that contact may be made between the yieldingly mounted contacts 53 and 54 and their cooperating stationary contacts 58 and 59. When the coil is deenergized, the armature is released by gravity to effect disengagement between these contact members, the armature being limited, in its turning movement, by the bracket 63.

The base 49 is provided with a plurality of terminals or binding posts 66 to 72, inclusive, in order that electrical connection may be made between the various cooperating elements, substantially as shown in Fig. 1. The stationary contact 27 of the instrument 25 may be connected to the binding post 71, the stationary contact 26 to the binding post 72, and the movable contact member 28 to the binding post 70.

Figure 4:
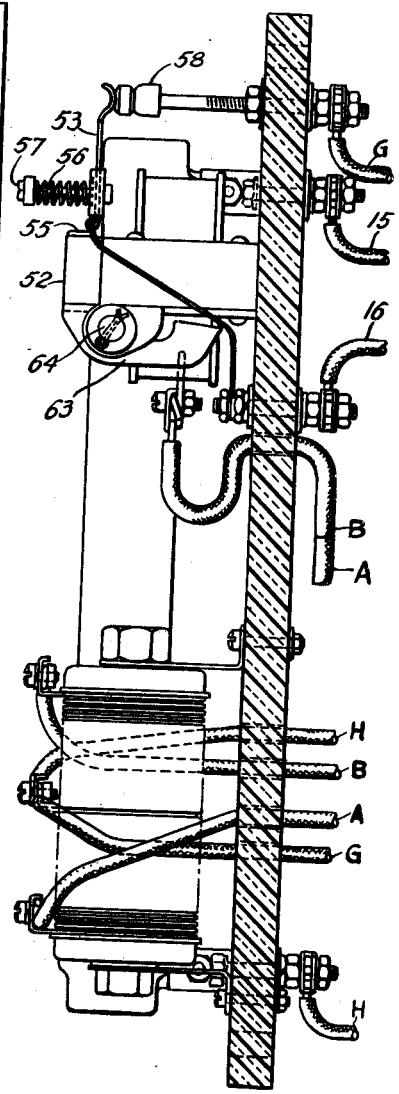
Fig. 4 is a view, in section, taken on the line IV—IV of the device illustrated in Fig. 3.

The rectifying element, the coil 17, the resistor 29 and the switches 18 and 31 may be provided with suitable conductors by means of which the assembly illustrated in Figs. 3 and 4 may be connected to the instrument 25 and the electric energy supply conductors 15 and 16, as shown in Fig. 1.

Various modifications may be made in the device embodying my invention without departing from the spirit and the scope thereof. I desire, therefore, that only such limitations shall be placed thereon as are imposed by the prior art and are set forth in the appended claims.

I claim as my invention:

1. In combination, a source of alternating current, a magnet coil, a rectifier for supplying unidirectional current from said source to said coil, and means, responsive to a condition to be controlled, for short-circuiting said rectifier to effect deenergization of said coil when said condition reaches a predetermined value in one direction and for connecting said source to the rectifier when said condition reaches a predetermined value in another direction.

2. In combination, a contact-making-and-breaking instrument, a source of alternating current, a rectifier connected between said instrument and said source of current, and an electromagnet coil energized by unidirectional current from said rectifier, whereby unidirectional current may be supplied to said coil and whereby said coil may be controlled by controlling the alternating-current supply to said rectifier by means of said instrument.

In testimony whereof, I have hereunto subscribed my name this 7th day of July, 1927.

GEORGE C. PEARCE.